(12) United States Patent
Zhang et al.

(10) Patent No.: US 11,931,708 B2
(45) Date of Patent: Mar. 19, 2024

(54) CARBON DIOXIDE FLUIDITY CONTROL DEVICE AND METHOD

(71) Applicant: China University of Petroleum (East China), Qingdao (CN)

(72) Inventors: Chao Zhang, Qingdao (CN); Zhaomin Li, Qingdao (CN); Songyan Li, Qingdao (CN); Yong Wang, Dongying (CN); Guangzhong Lv, Dongying (CN); Shouya Wu, Qingdao (CN); Linghui Xi, Qingdao (CN); Meijia Wang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 646 days.

(21) Appl. No.: 17/264,539

(22) PCT Filed: Apr. 17, 2020

(86) PCT No.: PCT/CN2020/085292
§ 371 (c)(1),
(2) Date: Jan. 29, 2021

(87) PCT Pub. No.: WO2020/216142
PCT Pub. Date: Oct. 29, 2020

(65) Prior Publication Data
US 2021/0220784 A1    Jul. 22, 2021

(30) Foreign Application Priority Data
Apr. 22, 2019    (CN) .......................... 201910322036.4

(51) Int. Cl.
*C09K 8/594*    (2006.01)
*B01F 23/41*    (2022.01)
(Continued)

(52) U.S. Cl.
CPC .............. *B01F 33/71* (2022.01); *B01F 23/41* (2022.01); *B01F 31/83* (2022.01); *B01F 33/813* (2022.01);
(Continued)

(58) Field of Classification Search
None
See application file for complete search history.

(56) References Cited

U.S. PATENT DOCUMENTS

| 10,047,275 B2 | 8/2018 | Al-Otaibi et al. |
| 2010/0243248 A1* | 9/2010 | Golomb .............. E21B 41/0064 166/270 |

(Continued)

FOREIGN PATENT DOCUMENTS

| CN | 102746841 A | 10/2012 |
| CN | 103867169 A | 6/2014 |

(Continued)

*Primary Examiner* — Andrew Sue-Ako
(74) *Attorney, Agent, or Firm* — Volpe Koenig

(57) ABSTRACT

Provided is a carbon dioxide fluidity control device comprising, a sample preparation tank, a high-pressure stirring unit, a reciprocating plunger pump and a booster pump, wherein the stirring unit comprises one or more high-pressure stirring tanks, each provided with an atomizing spray probe and a piston, wherein a discharge port of the sample preparation tank is connected to the atomizing spray probe via a plunger pump, which is connected to the piston to push the piston to reciprocate; the booster pump is connected to the high-pressure stirring tanks to provide supercritical carbon dioxide to the high-pressure stirring tank; and a discharge port of the high-pressure stirring tanks is connected to an oilfield well group. Provided is a carbon dioxide fluidity control method using the device, comprising mixing surfactants and nanoparticles with heated carbon dioxide, and injecting a microemulsion of supercritical (Continued)

carbon dioxide and nano-silicon dioxide into an oilfield well group.

13 Claims, 1 Drawing Sheet

(51) Int. Cl.
　　*B01F 31/80*　　(2022.01)
　　*B01F 33/71*　　(2022.01)
　　*B01F 33/81*　　(2022.01)
　　*B01F 35/71*　　(2022.01)
　　*B01F 23/40*　　(2022.01)
　　*B01F 33/45*　　(2022.01)
　　*B01F 101/49*　　(2022.01)
　　*C09K 8/584*　　(2006.01)

(52) U.S. Cl.
　　CPC ........ *B01F 35/712* (2022.01); *B01F 35/7179* (2022.01); *B01F 23/4143* (2022.01); *B01F 23/4146* (2022.01); *B01F 23/481* (2022.01); *B01F 33/45* (2022.01); *B01F 2101/49* (2022.01); *C09K 8/584* (2013.01); *C09K 8/594* (2013.01); *C09K 2208/10* (2013.01)

(56) References Cited

U.S. PATENT DOCUMENTS

| | | | | |
|---|---|---|---|---|
| 2014/0151050 | A1* | 6/2014 | Sanders | ........ E21B 43/166 166/305.1 |
| 2018/0333692 | A1 | 11/2018 | Zhang et al. | |
| 2019/0010382 | A1 | 1/2019 | Kuznetsov et al. | |

FOREIGN PATENT DOCUMENTS

| | | |
|---|---|---|
| CN | 104194762 A | 12/2014 |
| CN | 104549021 A | 4/2015 |
| CN | 105038756 A | 11/2015 |
| CN | 105238380 A | 1/2016 |
| CN | 105257264 A | 1/2016 |
| CN | 105271259 A | 1/2016 |
| CN | 107597001 A | 1/2018 |
| CN | 109233784 A | 1/2019 |
| CN | 109999684 A | 7/2019 |

* cited by examiner

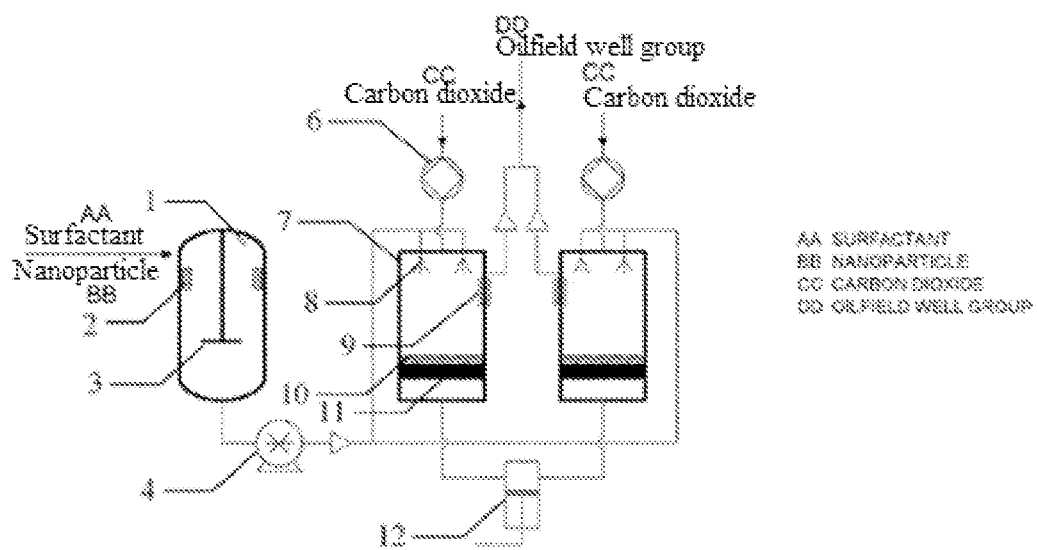

CARBON DIOXIDE FLUIDITY CONTROL DEVICE AND METHOD

CROSS REFERENCE TO RELATED APPLICATIONS

This application is a 35 USC § 371 National Stage application of International Patent Application No. PCT/CN2020/085292, which was filed Apr. 17, 2020, entitled "A CARBON DIOXIDE FLUIDITY CONTROL DEVICE AND METHOD," and claims priority to Chinese Patent Application No. 201910322036.4, filed Apr. 22, 2019 and is incorporated herein by reference as if fully set forth.

FIELD

The present disclosure relates to the technical field of oil and gas field development and oil extraction engineering, in particular to a carbon dioxide fluidity control device and a method.

BACKGROUND

Carbon dioxide is the most widely utilized gas oil displacement agent in the world and has been successfully applied to the development process of various oil and gas reservoirs. The technology for improving the oil and gas exploitation efficiency by means of carbon dioxide have become a research hotspot again in recent years due to the urgent requirement of carbon emission reduction in various countries in the world and the imperative trend of developing unusual oil and gas reservoirs such as compact oil and shale oil/gas.

In the process of improving the oil and gas exploitation effect by means of carbon dioxide, both the temperature and the pressure of most reservoirs are above the critical point of carbon dioxide, so that the carbon dioxide often exists in a supercritical state after arriving at the stratum. The supercritical carbon dioxide has a density close to that of a liquid and has the strength of a exiting liquid solvent; its viscosity is similar to the carbon dioxide gas, thus the supercritical carbon dioxide has desirable fluidity. The properties enable the supercritical carbon dioxide to contact with crude oil for many times, extract the light components of crude oil; however, it also causes premature gas channeling due to its characteristics of low viscosity and easy flow, thus the spread volume is small and the oil displacement efficiency is low. Therefore, many techniques for controlling carbon dioxide fluidity have emerged, such as water and gas alternate injection technique, and foaming technique. Such techniques have obvious effects on high-permeability oil reservoirs and common low-permeability oil reservoirs, but when the techniques are applied to ultra-low permeability oil reservoirs such as compact oil and shale oil, the injection capacity is low or even the surfactant cannot be injected due to high injection pressure in the process of injecting water or surfactant aqueous solution, thereby restraining the application of the techniques.

In order to solve the problem, CN103867169A proposes a method for applying a gas-soluble surfactant to fluidity control of carbon dioxide oil displacement, the method utilizes the characteristic that the supercritical carbon dioxide has certain dissolving capacity for some specific surfactants, implements an anhydrous carrying based on the surfactant, thereby greatly improving the injection capacity of the surfactant and performing the application of the technique to foam fluidity control of carbon dioxide in an ultra-low permeability reservoir.

However, during the process of controlling the fluidity of the carbon dioxide by using the foam, given that the foam per se is a thermodynamically unstable system and will be prone to destruction and disappearance during its migration process in the stratum, so that the fluidity control action range is small and is generally restrained to a near wellbore area. The solid phase particles based on nanoparticles, inorganic fine particles and the like have been widely used for enhancing stability of foams along with the rapid development of nanotechnology in recent years. For example, CN105038756A discloses a system and method for stabilizing carbon dioxide foam by using hydrophilic nanoparticles. CN102746841A discloses a composite foam system added with modified nanoparticles. CN105238380A discloses a method of enhancing foam stability by using inorganic fine particles. However, the common problem of such methods is that when the technology is used in an oil field and mining field, it is still required to dissolve the nanoparticles in a water phase, or even need to compound and mix the nanoparticles with a surfactant in advance, and then the prepared solution is injected into a stratum to realize the effect of stabilizing foam, as a result, the technology still faces the problem of incapability of injection when being applied to an ultra-low permeability oil reservoir with difficult water injection; in addition, when the nanoparticles are dissolved in a water phase for injection, the nanoparticles are easy to agglomerate and adsorb on the wall surface of a rock due to the high surface energy, so that the wastage quantity is high, and the operational cost is significantly increased.

The supercritical carbon dioxide microemulsion is used as a gas-in-water type emulsion (the continuous phase is carbon dioxide, and the dispersed phase is water), it is a thermodynamic stable system, and frequently applied in the field of nanometer material synthesis in recent years because the diameter of an aggregate or the thickness of an aggregate molecular layer is close to nanometer level, namely a nano-scale "micro water pool" of the supercritical carbon dioxide microemulsion is used as a reaction vessel, so that the size of the synthesized material is controlled to be nanometer level. However, the synthesis reaction is mainly used for preparing the nanometer material, the fluidity control capability of the nanometer material has not been proved, and the stability of the nanometer material cannot be ensured. CN105271259A discloses a preparation method of a supercritical $CO_2$ nano-silica microemulsion, but the microemulsion system prepared with the method is a system which simply disperses nano-silica particles in a supercritical $CO_2$ phase, because the system does not contain a surfactant, the system cannot generate foam when meeting with water, thus the system does not have the capability of controlling the carbon dioxide fluidity.

SUMMARY

The present disclosure aims to overcome the problems in the prior art that the carbon dioxide fluidity control capability is insufficient, the carbon dioxide fluidity control is unstable, the use range of carbon dioxide foam technology is limited, and provides a carbon dioxide fluidity control device and method. The method adopts a suitable surfactant and the compatible nano-particles, improves the control capability of the carbon dioxide foam technology on the carbon dioxide fluidity, controls the carbon dioxide fluidity in a more stable manner, and further expands the use range of the carbon dioxide foam technology.

In order to fulfill the aforementioned purpose, a first aspect of the present disclosure provides a device for controlling carbon dioxide fluidity, wherein the device comprises a sample preparation tank, a high-pressure stirring unit, a reciprocating plunger pump and a booster pump, and wherein the high-pressure stirring unit comprises one or more high-pressure stirring tanks, each of the high-pressure stirring tanks is provided with an atomizing spray probe and a piston, a discharge port of the sample preparation tank is connected to the atomizing spray probe via a plunger pump, the reciprocating plunger pump is connected to the piston so as to push the piston to reciprocate, the booster pump is connected to the high-pressure stirring tanks so as to provide supercritical carbon dioxide to the high-pressure stirring tank, and a discharge port of the high-pressure stirring tank is connected to an oilfield well group.

Preferably, an ultrasonic emission probe and a stirring device are disposed in the sample preparation tank.

Preferably, a magnetic stirring device is arranged on the piston in the high-pressure stirring tank.

In another aspect, the present disclosure provides a method for controlling carbon dioxide fluidity by using the device as previously mentioned, including:

(i) adding a surfactant and nanoparticles into the sample preparation tank to prepare a mixed solution of the surfactant and the nanoparticles;

(ii) injecting carbon dioxide into the high-pressure stirring tank by the booster pump, and heating the carbon dioxide;

(iii) pumping the mixed solution prepared in step (i) by the plunger pump and atomizing the mixed solution by the atomizing spray probe, and then spraying the mixed solution into the high-pressure stirring tank for stirring;

(iv) injecting a microemulsion of supercritical carbon dioxide and nano-silica prepared in step (iii) into a subsequent oilfield well group.

Preferably, the surfactant in step (i) is fatty alcohol polyoxyethylene polyoxypropylene ether or sodium 2-ethylhexyl sulfosuccinate.

Preferably, the nanoparticles are hydrophilic nano-silica particles or hydrophobic nano-silica particles.

Preferably, when the surfactant is fatty alcohol polyoxyethylene polyoxypropylene ether, the nanoparticles are hydrophilic nano-silica particles, and dosage mass ratio of each components is as follows:

the mass ratio of the carbon dioxide, the fatty alcohol polyoxyethylene polyoxypropylene ether, the hydrophilic nano-silica particles and water is 100:(1-1.5):(0.5-1):(2-4).

Preferably, when the surfactant is sodium 2-ethylhexyl sulfosuccinate, and the nanoparticles are hydrophobic nano-silica particles, absolute ethanol is added into the sample preparation tank as an auxiliary agent, and dosage mass ratio of each components is as follows:

the mass ratio of the carbon dioxide, the 2-ethylhexyl sodium sulfosuccinate, the absolute ethanol, the hydrophobic nano-silica particles and water is 100:(0.5-2):(5-10):(0.5-1.5):(1-3).

Preferably, the preparation process in step (i) is dispersed for 25-35 minutes under stirring action and ultrasonic cavitation action.

Preferably, the stirring rate of the stirring action is within a range of 7,000-9,000 rpm.

Preferably, the power of the ultrasonic cavitation action is within a range of 15-25 kw.

Preferably, the operation procedure in step (ii) comprises: adding the carbon dioxide into the high-pressure stirring tank by the booster pump boosting the pressure to 10-25 MPa, starting a heating constant-temperature device of the high-pressure stirring tank, and heating to 30-50° C. at a constant temperature.

Preferably, the stirring rate in step (iii) is within a range of 1,000-2,000 rpm, and the stirring time is within a range of 20-40 minutes.

Because the continuous phase is the supercritical carbon dioxide, the dispersed phases are the nanoparticles and the surfactant, the microemulsion of supercritical carbon dioxide and nano-silica prepared with the technical solution of the present disclosure has desirable injection capability, particularly in an ultra-low permeability oil reservoir having small pore throat.

Moreover, when the microemulsion of supercritical carbon dioxide and nano-silica prepared with the technical solution of the present disclosure is migrated in a stratum, the microemulsion can interact with the stratum water under the shearing action of the pore throats of the stratum to form gas-in-water carbon dioxide foam, and the nanoparticles can be adsorbed on a gas-liquid interface in the process of changing gas-in-water phase into gas-in-water phase, so that the stability of the foam is enhanced, and the timeliness of controlling the carbon dioxide fluidity by the microemulsion is improved.

BRIEF DESCRITION OF THE DRAWINGS

FIG. 1 shows a carbon dioxide fluidity control device according to the present disclosure.

DESCRIPTION OF THE REFERENCE SIGNS

1. Sample preparation tank
2. Ultrasonic emission probe
3. Stirring device
4. Plunger pump
6. Booster pump
7. High-pressure stirring unit
8. Atomizing spray probe
9. Sapphire pressure-resistant visualization window
10. Magnetic stirring device
11. Piston
12. Reciprocating plunger pump

DETAILED DESCRPITION

The following content provides the detailed description in regard to the specific embodiments of the present disclosure with reference to the drawings. It should be understood that the specific embodiments detailed herein is only used for illustrating and explaining the present disclosure, instead of imposing a limitation thereto.

In order to fulfill the aforementioned purpose, a first aspect of the present disclosure provides a device for controlling carbon dioxide fluidity, as shown in FIG. 1, wherein the device comprises a sample preparation tank 1, a high-pressure stirring unit 7, a reciprocating plunger pump 12 and a booster pump 6, wherein the high-pressure stirring unit 7 comprises one or more high-pressure stirring tanks, each of the high-pressure stirring tanks is provided with an atomizing spray probe 8 and a piston 11, a discharge port of the sample preparation tank 1 is connected to the atomizing spray probe 8 via a plunger pump 4, the reciprocating plunger pump 12 is connected to the piston 11 so as to push the piston 11 to reciprocate, the booster pump 6 is connected to the high-pressure stirring tank so as to provide supercritical carbon dioxide to the high-pressure stirring tank, and a discharge port of the high-pressure stirring tank is connected to an oilfield well group.

In the device of the present disclosure, the high-pressure stirring unit 7 comprises 1-4 high-pressure stirring tanks, specifically, one, two, three or four high-pressure stirring tanks, for example; and preferably, the high-pressure stirring unit 7 includes two high-pressure stirring tanks.

In the device of the present disclosure, an ultrasonic emission probe 2 and a stirring device 3 are disposed in the sample preparation tank 1. When the surfactant and the nano-particles are added into the sample preparation tank 1, the surfactant and the nano-particles are dispersed into a microe mulsion system of surfactant and nano-silica under the stirring action of the stirring device 3 and the ultrasonic cavitation action of the ultrasonic emission probe 2.

In the device of the present disclosure, the ultrasonic emission probe 2 is disposed on the inner wall of the sample preparation tank 1, the number of the ultrasonic emission probe 2 is within a range of one to five, specifically, the number of the ultrasonic emission probe 2 may be one, two, three, four or five, and preferably, the number of the ultrasonic emission probe 2 is two.

In the device of the present disclosure, a magnetic stirring device 10 is arranged on the piston 11 in the high-pressure stirring tank. After the surfactant and nanoparticle mixed solution is sprayed into the high-pressure stirring tank through the pumping by the plunger pump 4 and an atomization by the atomization spray probe 8, the pressure and the temperature in the high-pressure stirring tank are stabilized in a faster mode through the stirring of the magnetic stirring device 10.

According to a specific embodiment, as shown in FIG. 1, the carbon dioxide fluidity control device comprises a sample preparation tank 1, a high-pressure stirring unit 7, a reciprocating plunger pump 12 and a booster pump 6, the high-pressure stirring unit 7 comprises two high-pressure stirring tanks, each of the high-pressure stirring tanks is provided with an atomizing injection probe 8 and a piston 11, the sample preparation tank 1 is provided with two ultrasonic emission probes 2 and a stirring device 3, therein a discharge port of the sample preparation tank 1 is connected to the atomizing spray probe 8 via a plunger pump 4, the reciprocating plunger pump 12 is connected to the piston 11 so as to push the piston 11 to reciprocate, a magnetic stirring device 10 is arranged on the piston 11, the booster pump 6 is connected to the high-pressure stirring tank so as to provide supercritical carbon dioxide to the high-pressure stirring tank, and a discharge port of the high-pressure stirring tank is connected to an oilfield well group.

The carbon dioxide fluidity control device provided by the present disclosure has the following operation processes: adding a surfactant and nanoparticles into a sample preparation tank, and dispersing the surfactant and the nanoparticles under the stirring action of a stirring device and the ultrasonic cavitation action of an ultrasonic emission probe so as to prepare a surfactant and nanoparticle mixed solution; injecting carbon dioxide into a high-pressure stirring tank through a booster pump, boosting the pressure, starting a heating constant-temperature device of the high-pressure stirring tank, and heating at a constant temperature; spraying the prepared mixed solution into a high-pressure stirring tank through a plunger pump and an atomization spraying probe in a high-pressure atomization manner, and simultaneously switching on a magnetic stirring device in the high-pressure stirring tank for stirring, so as to prepare the stable microemulsion of supercritical carbon dioxide and nano-silica; and injecting the prepared microemulsion of supercritical carbon dioxide and nano-silica into a subsequent oilfield well group.

A stirring device and an ultrasonic emission probe are arranged in the sample preparation tank, such that the dispersion of the surfactant and the nano-particles can be accelerated through the stirring action and the ultrasonic cavitation action, and the distribution is more uniform; the high-pressure stirring tank is provided with a heating device and an atomization injection probe, the high-pressure stirring tank is in a high-temperature and high-pressure condition by heating and injecting carbon dioxide, the surfactant and the nanoparticle aqueous solution which are prepared according to a certain proportion are dispersed into a supercritical carbon dioxide phase by high-pressure atomization injection, the pressure adjustment may be used for promoting a reverse micellization of surfactant molecules in the supercritical carbon dioxide phase, and solubilization of nanoparticles in the aqueous solution can be realized while solubilizing a small amount of water in the process, so that the stable microemulsion of supercritical carbon dioxide and nano-silica is prepared.

In a second aspect, the present disclosure also provides a method for controlling carbon dioxide fluidity by using the device as previously mentioned, including:

(i) adding a surfactant and nanoparticles into the sample preparation tank 1 to prepare a mixed solution of surfactant and nanoparticles;

(ii) injecting carbon dioxide into the high-pressure stirring tank by the booster pump 6, and beating the carbon dioxide;

(iii) pumping the mixed solution prepared in step (i) by the plunger pump 4 and atomizing the mixed solution by the atomizing spray probe 8, and then spraying the mixed solution into the high-pressure stirring tank for stirring;

(iii) injecting a microemulsion of supercritical carbon dioxide and nano-silica prepared in step (iii) into a subsequent oilfield well group.

In the method of the present disclosure, based on the construction mode of a gas-in-water type emulsion of a supercritical carbon dioxide microemulsion and the solubilization and extraction mechanism of the emulsion on the organic macromolecules, the construction process of the supercritical carbon dioxide microemulsion is changed, namely the original process of solubilizing a small amount of water by reverse micellization formed by surfactant molecules in a supercritical carbon dioxide phase under the conditions of high temperature and high pressure, is altered into the process that the surfactant and the nanoparticle aqueous solution which are prepared according to a certain proportion are dispersed into a supercritical carbon dioxide phase under the conditions of high temperature and high pressure, the pressure adjustment process may be used for promoting a reverse micellization of surfactant molecules in the supercritical carbon dioxide phase, and solubilization of hydrophilic nanoparticles in the aqueous solution can be realized (the solubilization of hydrophobic nanoparticles need the assistance of an auxiliary agent such as ethanol) while solubilizing a small amount of water in the process, so as to construct and prepare the microemulsion of supercritical carbon dioxide and nano-silica.

The method can prepare the stable microemulsion of supercritical carbon dioxide, when the nano-silica and the microemulsion system of supercritical carbon dioxide and nano-silica is migrated in the stratum, it may contact with the crude oil in the stratum, and the carbon dioxide can be dissolved in the crude oil in the stratum during the contact process, so as to expand and energize the crude oil in the stratum; the surfactant and the nanoparticles can react with the crude oil and the rock wall surface, so that the oil washing efficiency is improved; meanwhile, when the microemulsion system contacts with stratum water, supercritical carbon dioxide foam can be formed under the shearing action of a porous medium in the stratum, and the nanoparticles will be adsorbed on a gas-liquid interface during the process of forming foam, so as to play a role of stabilizing foam and blocking the carbon dioxide, thereby controlling the carbon dioxide fluidity, forcing more and more carbon dioxide injected subsequently to enter an oil-bearing formation and section, and performing the high-efficiency oil extraction.

In the method of the present disclosure, for the sake of enabling the supercritical carbon dioxide microemulsion and the nanoparticles to form a complete and stable system, it is necessary to find out a suitable surfactant from the surfactants capable of forming the supercritical carbon dioxide microemulsion, and search out the nanoparticles which are compatible with the surfactant.

The surfactant and nanoparticles shall satisfy the following conditions:

(i) the surfactant can form a supercritical carbon dioxide microemulsion in a supercritical carbon dioxide phase, or can form the supercritical carbon dioxide microemulsion under the assistance of a certain auxiliary agent;

(ii) the surfactant is capable of forming the stable carbon dioxide foam;

(iii) the surfactant and the nanoparticles are capable of synergistically stabilizing the carbon dioxide foam;

(iv) the surfactant and the nanoparticles can stably exist in the supercritical carbon dioxide microemulsion;

(v) the surfactant, the nano-particles and the auxiliary agent do not pollute the environment, are available at a low price and suitable for the large-scale application.

Preferably, the surfactant in step (i) is fatty alcohol polyoxyethylene polyoxypropylene ether or sodium 2-ethylhexyl sulfosuccinate.

Preferably, the nanoparticles in step (i) are hydrophilic nano-silica particles or hydrophobic nano-silica particles.

In the method, when the surfactant is fatty alcohol polyoxyethylene polyoxypropylene ether, the nanoparticles are hydrophilic nano-silica particles, and dosage mass ratio of components is as follows:

the mass ratio of the carbon dioxide, the fatty alcohol polyoxyethylene polyoxypropylene ether, the hydrophilic nano-silica particles and water is 100:(1-1.5):(0.5-1):(2-4). Preferably, the mass ratio of the carbon dioxide, the fatty alcohol polyoxyethylene polyoxypropylene ether, the hydrophilic nano-silica particles and water is 100:(1.1-1.4):(0.6-0.9):(2.5-3.5).

In the method of the present disclosure, when the surfactant is sodium 2-ethylhexyl sulfosuccinate and the nanoparticles are hydrophobic nano-silica particles, it is required to add absolute ethanol into the sample preparation tank 1 as an auxiliary agent, and dosage mass ratio of components is as follows:

the mass ratio of the carbon dioxide, the 2-ethylhexyl sodium sulfosuccinate, the absolute ethanol, the hydrophobic nano-silica particles and water is 100:(0.5-2):(5-10):(0.5-1.5):(1-3).

Preferably, the mass ratio of the carbon dioxide, the 2-ethylhexyl sodium sulfosuccinate, absolute ethanol, the hydrophobic nano-silica particles and water is 100:(0.8-1.8):(6-8):(0.8-1.2):(1-3), more preferably, the mass ratio of the carbon dioxide, the 2-ethylhexyl sodium sulfosuccinate, the absolute ethanol, the hydrophobic nano-silica particles and water is 100:(1-1.5):(6-8):(0.8-1.2):(1-3).

In the method of the present disclosure, the surfactant and the nanoparticles are required to be dispersed for 25-35 minutes under the stirring action and the ultrasonic cavitation action during the preparation process in step (i).

In specific implementation process, the dispersing time may be 25 minutes, 27 minutes, 29 minutes, 31 minutes, 33 minutes or 35 minutes, and preferably, the dispersing time is 30 minutes.

In the method of the present disclosure, the stirring rate in step (i) is within a range of 7,000-9,000 rpm, the stirring rate is specifically 7,000 rpm, 8,000 rpm or 9,000 rpm, preferably 8,000 rpm.

In the method of the present disclosure, the power of the ultrasonic cavitation in step (i) is within a range of 15-25 kW; specifically, the power of the ultrasonic cavitation may be 15 kW, 17 kW, 19 kW, 21 kW, 23 kW or 25 kW, and preferably, the power of the ultrasonic cavitation is 20 kW.

In the method of the present disclosure, the operation procedure in step (ii) comprises: adding carbon dioxide into the high-pressure stirring tank through the booster pump 6, boosting the pressure to 10-25 MPa, starting a heating constant-temperature device of the high-pressure stirring tank, and heating to 30-50° C. at a constant temperature.

In a specific embodiment, the preset pressure may be 10 MPa, 12 MPa, 14 MPa, 16 MPa, 18 MPa, 20 MPa, 22 MPa or 25 MPa, and preferably, the preset pressure is 20 MPa.

In a specific embodiment, the preset temperature may be 30° C., 35° C., 40° C., 45° C. or 50° C., and preferably, the preset temperature is 40° C.

In the method of the present disclosure, the stirring rate in step (iii) is within a range of 1,000-2,000 rpm, and the stirring time is within a range of 20-40 minutes.

In a specific embodiment, the stirring rate in step (iii) may be 1,000 rpm, 1,500 rpm or 2,000 rpm, and preferably, the stirring rate is 1,500 rpm.

In a specific embodiment, the stirring time in step (iii) may be 20 minutes, 25 minutes, 30 minutes, 35 minutes or 40 minutes, and preferably, the stirring time is 30 minutes.

After the stirring process, the pressure and temperature of the high-pressure stirring tank are monitored, the clarification or turbidity degree in the high-pressure stirring tank is observed through a sapphire pressure-resistant visualization window 9 after the pressure and the temperature are stable, the pressure in the high-pressure stirring tank is adjusted through a reciprocating plunger pump 12, recording the turbidity point pressure and the temperature at the moment when the turbidity in the high-pressure stirring tank changes into clarification, the mass of carbon dioxide in the high-pressure stirring tank at the moment can be calculated according to the turbidity point pressure and the temperature, the formula proportion required for preparing the stable microemulsion of supercritical carbon dioxide and nano-silica can then be calculated according to the mass of a surfactant and nanoparticles added into the high-pressure stirring tank.

In the step (iv) of the method according to the present disclosure, the microemulsion of supercritical carbon dioxide and nano-silica prepared in step (iii) is continuously injected into an oilfield well group through a one-way valve and a pipeline under the pressurization effect of a reciprocating plunger pump 12, the pressure is continuously increased during the injection process, such that the stability of the microemulsion of supercritical carbon dioxide and nano-silica can be ensured, the diffusion mass transfer capacity of the microemulsion can also be improved under the high pressure, the mobility of the microemulsion in the stratum is enhanced, thus the injection capacity of the microemulsion is further improved.

The present disclosure will be described in detail below with reference to examples. In the following examples, the fatty alcohol polyoxyethylene polyoxypropylene ether is purchased from the Dow Chemical Company in the USA; the sodium 2-ethylhexyl sulfosuccinate is commercially available from Sigma Chemical Corporation in the USA; the hydrophilic nano-silica particles and the hydrophobic nano-silica particles are purchased from the Wacker Chemical Company of the Germany; the absolute ethanol is commercially available from the Sinopharm Chemical Reagent Co., Ltd.

The following examples and comparative examples are performed in the following carbon dioxide fluidity control devices:

the device for controlling carbon dioxide fluidity comprises a sample preparation tank 1, a high-pressure stirring unit 7, a reciprocating plunger pump 12 and a booster pump 6, wherein the high-pressure stirring unit 7 comprises one to four high-pressure stirring tanks, each of the high-pressure stirring tanks is provided with an atomizing injection probe 8 and a piston 11, the sample preparation tank 1 is provided with one to five ultrasonic emission probes 2 and a stirring device 3. therein a discharge port of the sample preparation tank 1 is connected to the atomizing spray probe 8 via a plunger pump 4, the reciprocating plunger pump 12 is connected to the piston 11 so as to push the piston 11 to reciprocate, a magnetic stirring device 10 is arranged on the piston 11, the booster pump 6 is connected to the high-pressure stirring tank so as to provide supercritical carbon dioxide to the high-pressure stirring tank, and a discharge port of the high-pressure stirring tank is connected to an oilfield well group.

Example 1

(i) the fatty alcohol polyoxyethylene polyoxypropylene ether and hydrophilic nano-silica particles were added into a sample preparation tank 1, the components were dispersed for 25 minutes under the stirring action of a stirring device 3 and the ultrasonic cavitation action of an ultrasonic emission probe 2, a mixed solution of a surfactant and the nanoparticles was prepared, wherein the stirring speed was 7,000 rpm, and the power of the ultrasonic emission probe was 15 kW;

(ii) carbon dioxide was injected into a high-pressure stirring tank through a booster pump 6, the pressure was boosted to 25 MPa, a heating constant-temperature device of the high-pressure stirring tank was started, and the temperature was kept at 50° C.;

(iii) the mixed solution prepared in the step (i) was pumped by a plunger pump 4 and subjected to a high-pressure atomization by an atomizing spray probe 8 and then sprayed into a high-pressure stirring tank, a magnetic stirring device 10 in the high-pressure stirring tank was simultaneously started for stirring at the speed of 1,000 rpm for 20 minutes, such that a stable microemulsion A1 of supercritical carbon dioxide and nano-silica was prepared, wherein dosage mass ratio of components in the microemulsion A1 of supercritical carbon dioxide and nano-silica was as follows: the mass ratio of the carbon dioxide, the fatty alcohol polyoxyethylene polyoxypropylene ether, the hydrophilic nano-silica particles and water was 100:1:0.5:2;

(iv) the microemulsion A1 of supercritical carbon dioxide and nano-silica prepared in the step (iii) was injected into a subsequent oilfield well group.

Example 2

(i) the 2-ethylhexyl sodium sulfosuccinate, absolute ethanol and hydrophobic nano-silica particles were added into a sample preparation tank 1, the components were dispersed for 30 minutes under the stirring action of a stirring device 3 and the ultrasonic cavitation action of an ultrasonic emission probe 2, a mixed solution of a surfactant and the nanoparticles was prepared, wherein the stirring speed was 8,000 rpm, and the power of the ultrasonic emission probe was 20 kW;

(ii) carbon dioxide was injected into a high-pressure stirring tank through a booster pump 6, the pressure was boosted to 20 MPa, a heating constant-temperature device of the high-pressure stirring tank was started, and the temperature was kept at 40° C.;

(iii) the mixed solution prepared in the step (i) was pumped by a plunger pump 4 and subjected to a high-pressure atomization by an atomizing spray probe 8 and then sprayed into a high-pressure stirring tank, a magnetic stirring device 10 in the high-pressure stirring tank was simultaneously started for stirring at the speed of 1,500 rpm for 30 minutes, such that a stable microemulsion A2 of supercritical carbon dioxide and nano-silica was prepared, wherein dosage mass ratio of components in the microemulsion A2 of supercritical carbon dioxide and nano-silica was as follows: the mass ratio of carbon dioxide, the 2-ethylhexyl sodium sulfosuccinate, the absolute ethanol, the hydrophobic nano-silica particles and water was 100:0.5:5:0.5:1;

(iv) the microemulsion A2 of supercritical carbon dioxide and nano-silica prepared in the step (iii) was injected into a subsequent oilfield well group.

Example 3

(i) the fatty alcohol polyoxyethylene polyoxypropylene ether and hydrophilic nano-silica particles were added into a sample preparation tank 1, the components were dispersed for 35 minutes under the stirring action of a stirring device 3 and the ultrasonic cavitation action of an ultrasonic emission probe 2, a mixed solution of a surfactant and the nanoparticles was prepared, wherein the stirring speed was 9,000 rpm, and the power of the ultrasonic emission probe was 25 kw;

(ii) carbon dioxide was injected into a high-pressure stirring tank through a booster pump 6, the pressure was boosted to 10 MPa, a heating constant-temperature device of the high-pressure stirring tank was started, and the temperature was kept at 30° C.;

(iii) the mixed solution prepared in the step (i) was pumped by a plunger pump 4 and subjected to a high-pressure atomization by an atomizing spray probe 8 and then sprayed into a high-pressure stirring tank, a magnetic stirring device 10 in the high-pressure stirring tank was simultaneously started for stirring at the speed of 2,000 rpm for 40 minutes, such that a stable microemulsion A3 of supercritical carbon dioxide and nano-silica was prepared, wherein dosage mass ratio of components in the microemulsion A3 of supercritical carbon dioxide and nano-silica was as follows: the mass ratio of the carbon dioxide, the fatty alcohol polyoxyethylene polyoxypropylene ether, the hydrophilic nano-silica particles and water was 100:1.5:1:4;

(iv) the microemulsion A3 of supercritical carbon dioxide and nano-silica prepared in the step (iii) was injected into a subsequent oilfield well group.

Example 4

The microemulsion A4 of supercritical carbon dioxide and nano-silica for controlling the carbon dioxide fluidity was prepared according to the method of Example 3, except that in the step (iii), the mass ratio of components in the microemulsion A4 of supercritical carbon dioxide and nano-silica was as follows: the mass ratio of the carbon dioxide, the fatty alcohol polyoxyethylene polyoxypropylene ether, the hydrophilic nano-silica particles and water was 100:1.3:0.8:3.

Comparative Example 1

The microemulsion D1 of supercritical carbon dioxide and nano-silica for controlling the carbon dioxide fluidity was prepared according to the method of Example 3, except that in the step (iii), the mass ratio of components in the microemulsion D1 of supercritical carbon dioxide and nano-silica was as follows: the mass ratio of the carbon dioxide, the fatty alcohol polyoxyethylene polyoxypropylene ether, the hydrophilic nano-silica particles and water was 100:2:2:6.

Comparative Example 2

The microemulsion D2 of supercritical carbon dioxide and nano-silica for controlling the carbon dioxide fluidity was prepared according to the method of Example 3, except that in the step (ii), the carbon dioxide was injected into a high pressure agitation tank through a booster pump 6 and the pressure was boosted to 5 MPa.

Test Example

The prepared microemulsions A1-A4 and D1-D2 of supercritical carbon dioxide and nano-silica were respectively injected into a rock core, reacted with water in the rock core to form supercritical carbon dioxide foam, the pressure difference at two ends of the rock core was recorded, a resistance factor f according to the Formula (1) was calculated, and the resistance factor f represented the effect of the microemulsions on controlling the carbon dioxide fluidity, wherein the test results were shown in Table 1.

$$f = \frac{\Delta P_2}{\Delta P_1} \quad (1)$$

Wherein $\Delta P_1$ represented the stable pressure difference between two ends of the rock core during the displacement process of the supercritical carbon dioxide at the same injection speed; and $\Delta P_2$ represented the stable pressure difference between two ends of the rock core during the displacement process of the microemulsion of supercritical carbon dioxide and nano-silica at the same injection speed.

TABLE 1

| No. | Resistance factor | Experiment phenomena |
|-----|------|----------------------|
| A1 | 25 | Foam output at an outlet of the rock core. Smoothly injected |
| A2 | 42 | Foam output at an outlet of the rock core. Smoothly injected |
| A3 | 38 | Foam output at an outlet of the rock core. Smoothly injected |
| A4 | 31 | Foam output at an outlet of the rock core. Smoothly injected |
| D1 | — | During the process of injecting the aqueous solution, the inlet pressure is continuously increased, there is not foam output at an outlet of the rock core, the pressure building state is displayed, and the aqueous solution cannot be injected smoothly. |
| D2 | — | During the process of injecting the aqueous solution, the inlet pressure is continuously increased, there is not foam output at an outlet of the rock core, the pressure building state is displayed, and the aqueous solution cannot be injected smoothly. |

The results in Table 1 demonstrate that the microemulsion of supercritical carbon dioxide and nano-silica prepared with the device and the method of the present disclosure can be smoothly injected into the rock core, and react with water in the rock core to form supercritical carbon dioxide foam, and have a desirable effect of controlling the carbon dioxide fluidity.

The preferred embodiments of the present disclosure have been described above in detail, but the present disclosure is not limited thereto. Within the scope of the technical idea of the present disclosure, many simple modifications can be made to the technical solution of the present disclosure, including various technical features being combined in any other suitable way, and these simple modifications and combinations should also be regarded as the disclosure of the present disclosure, and all fall within the scope of the present disclosure.

The invention claimed is:

1. A device for controlling carbon dioxide fluidity, wherein the device comprises a sample preparation tank, a high-pressure stirring unit, a reciprocating plunger pump and a booster pump, wherein the high-pressure stirring unit comprises one or more high-pressure stirring tanks; each of the high-pressure stirring tanks is provided with an atomizing spray probe and a piston, a discharge port of the sample preparation tank is connected to the atomizing spray probe via a plunger pump, the reciprocating plunger pump is connected to the piston so as to push the piston to reciprocate, the booster pump is connected to the high-pressure stirring tank so as to provide supercritical carbon dioxide to the high-pressure stirring tank, and a discharge port of the high-pressure stirring tank is connected to an oilfield well group;
   wherein the high-pressure stirring unit comprises one or more high-pressure stirring tanks having a preset pressure of 10-25 MPa.

2. The device of claim 1, wherein an ultrasonic emission probe and a stirring device are disposed in the sample preparation tank.

3. The device of claim 1, wherein a magnetic stirring device is arranged on the piston in the high-pressure stirring tank.

4. A method for controlling carbon dioxide fluidity by using the device of claim 1, including:

(i) adding a surfactant and nanoparticles of nano-silica into the sample preparation tank to prepare a mixed solution of surfactant and nanoparticles;

(ii) injecting carbon dioxide into the high-pressure stirring tank by means of a booster pump, and heating the carbon dioxide;

(iii) pumping the mixed solution prepared in step (i) by the plunger pump and atomizing the mixed solution by the atomizing spray probe, and then spraying the mixed solution into the high-pressure stirring tank for stirring; and (iv) injecting a microemulsion of supercritical carbon dioxide and nano-silica prepared in step (iii) into a subsequent oilfield well group.

5. The method of claim 4, wherein the surfactant in step (i) is fatty alcohol polyoxyethylene polyoxypropylene ether or sodium 2-ethylhexyl sulfosuccinate.

6. The method of claim 4, wherein the surfactant is fatty alcohol polyoxyethylene polyoxypropylene ether, the nanoparticles are hydrophilic nano-silica particles, and a dosage mass ratio is as follows:

the mass ratio of the carbon dioxide, the fatty alcohol polyoxyethylene polyoxypropylene ether, the hydrophilic nano-silica particles and water is 100:(1-1.5):(0.5-1):(2-4).

7. The method of claim 4, wherein the surfactant is sodium 2-ethylhexyl sulfosuccinate, and the nanoparticles are hydrophobic nano-silica particles, and absolute ethanol is added into the sample preparation tank as an auxiliary agent, and a dosage mass ratio of components is as follows:

the mass ratio of the carbon dioxide, the 2-ethylhexyl sodium sulfosuccinate, the absolute ethanol, the hydrophobic nano-silica particles and water is 100:(0.5-2):(5-10):(0.5-1.5):(1-3).

8. The method of claim 4, wherein the mixed solution in step (i) is dispersed for 25-35 minutes under stirring action and ultrasonic cavitation action.

9. The method of claim 8, wherein a stirring rate of the stirring action in step (i) is within a range of 7,000-9,000 rpm.

10. The method of claim 8, wherein a power of the ultrasonic cavitation action is within a range of 15-25 kW.

11. The method of claim 4, wherein step (ii) comprises: adding the carbon dioxide into the high-pressure stirring tank by the booster pump, boosting the pressure to 10-25 MPa, starting a heating constant-temperature device of the high-pressure stirring tank, and heating to 30-50° C. at a constant temperature.

12. The method of claim 4, wherein a stirring rate of the stirring in step (iii) is within a range of 1,000-2,000 rpm, and a stirring time of the stirring is within a range of 20-40 minutes.

13. The method of claim 4, wherein the nanoparticles in step (i) are hydrophilic nano-silica particles or hydrophobic nano-silica particles.

* * * * *